United States Patent [19]

Lecomte et al.

[11] Patent Number: 5,767,210
[45] Date of Patent: Jun. 16, 1998

[54] PROCESS FOR CONTROLLED RADICAL POLYMERIZATION OR COPOLYMERIZATION OF (METH)ACRYLIC AND VINYL MONOMERS AND (CO) POLYMERS OBTAINED

[75] Inventors: Philippe Lecomte, Jambes; Philippe Dubois, Ciplet; Robert Jerome, Tilff; Philippe Teyssie, Neuville en Condroz, all of Belgium; Thierry Senninger, Hayange, France

[73] Assignee: Elf Atochem, S.A., Puteaux, France

[21] Appl. No.: 827,386

[22] Filed: Mar. 27, 1997

[30] Foreign Application Priority Data

Aug. 12, 1996 [FR] France .................. 96 10124

[51] Int. Cl.$^6$ .................. C08F 4/80; C08F 2/00; C08F 20/06
[52] U.S. Cl. .................. 526/166; 526/206; 526/214; 526/317.1
[58] Field of Search .................. 526/166, 206, 526/214, 317.1

[56] References Cited

U.S. PATENT DOCUMENTS 3,331,827  7/1967  McCall et al. .................. 526/166
4,145,486  3/1979  Haag et al. .................. 521/31

FOREIGN PATENT DOCUMENTS 0 265 091  4/1988  European Pat. Off.

OTHER PUBLICATIONS

Otsu, "New Initiator Systems for Radical Polymerization of Vinyl Monomers", *Polymer Letters*, vol. 5, 697–701, 1967.

*Primary Examiner*—Joseph L. Schofer
*Assistant Examiner*—Wu C. Cheng
*Attorney, Agent, or Firm*—Millen, White, Zelano & Branigan, P.C.

[57] ABSTRACT

This process is characterized by the fact that at least one of the said monomers is polymerized or copolymerized in bulk, solution, emulsion or suspension, at a temperature that can be as low as 0° C., in the presence of an initiation system including: at least one compound generating radicals, other than bromofluorene, and at least one catalyst consisting of a complex of palladium in the 0 oxidation state, denoted by the following formula (I): $Pd(0)L^1L^2L^3L^4$ in which each of $L^1$, $L^2$, $L^3$ and $L^4$, which are identical or different, denotes a ligand which may be a chiral ligand, which is chosen from PRR'R", P(OR)(OR')(OR"), NRR'R", ORR', SRR', SeRR', AsRR'R", SbRR'R", where each of R, R' and R" independently denotes a $C_1$–$C_{14}$ alkyl group, optionally substituted, or an optionally substituted aromatic group, it being possible for at least two of these ligands to be joined to one another by one or more divalent radicals.

22 Claims, No Drawings

PROCESS FOR CONTROLLED RADICAL POLYMERIZATION OR COPOLYMERIZATION OF (METH)ACRYLIC AND VINYL MONOMERS AND (CO) POLYMERS OBTAINED

BACKGROUND OF THE INVENTION

The present invention relates to a process for controlled radical polymerization or copolymerization of (meth)acrylic and/or vinyl (for example vinylaromatic) monomers and to the polymers or copolymers thus obtained.

Radical polymerization is one of the polymerization processes which are most widely exploited industrially because of the variety of the polymerizable monomers (70% of the commercial monomers), of the ease of application and of the synthesis processes employed (emulsion, suspension, bulk, solution). However, in conventional radical polymerization it is difficult to control the size of the polymer chains and the molecular mass distribution. The polymers thus prepared contain chains of very large and very small masses (broad polydispersity), and this results in materials with uncontrolled properties. In addition, the sequential addition of monomer produces a mixture of homopolymers.

Anionic and cationic polymerization techniques, for their part, allow proper control of the process, but the reaction conditions which these polymerization methods require are not always capable of being implemented on an industrial scale. In addition, many monomers cannot be polymerized using these techniques.

Although a few examples of controlled radical polymerization of (meth)acrylic or vinylaromatic monomers exist at present, employing especially the complex $RuCl_2(PPh_3)_3$ (P=phosphorus and Ph=phenyl) used in combination with an aluminium alcoholate and the complex $CuCl/2,2'$-bipyridine, these catalyst systems have been found active in polymerization only at temperatures higher than 100° C. in the absence of activators. However, when the temperature is high, thermal autoinitiation takes place and this results, in particular, in a decrease in the control of the polymerization.

Simultaneous copolymerization of styrene and of methyl methacrylate has been performed using palladium tetrakis (triphenylphosphine) $Pd(PPh_3)_4$ in the presence of bromofluorene at ambient temperature. The degrees of conversion to polymer are, however, very low and this copolymerization cannot be described as a living one at this extremely low conversion (2%) (J. K. Stille, K. S. Y. Lau, J. Amer. Chem. Soc. 98, 5841 (1976)).

Otsu has taken great interest in the polymerization of styrene, of methyl methacrylate and of butadiene using systems including an activated metal in the 0 oxidation state and a halogen compound (T. Otsu, Polym. Lett. 1967, 5, 835, Polym. Lett. 1967, 5, 697 or J. Polym. Sci. Part A1 1970, 8, 785 or J. Polym. Sci. Part A1 1968, 6, 3075 or J. Macromol. Sci. Chem. 1969, A3(2), 177 or J. Polym. Sci. Part A1 1969, 7, 387 or J. Polym. Sci. Part A1 1969, 7, 3269). The metals employed may be various: they may be Ni, Pd, Co, Fe, Cu, Pt and Rh. The best polymerization results are obtained when the metal is present in an activated form. For example, in the case of nickel, it is necessary to employ Raney nickel or nickel freshly reduced with a stream of hydrogen. In the case of palladium (J. Polym. Sci. Part A1 1968, 6, 3075), the metal is deposited on active carbon. When used in methyl methacrylate polymerization at 60° C., metallic palladium on charcoal gives a polymerization yield which does not exceed 18.7% after 3 h. In all the papers cited there is no mention of the living character of the polymerization.

Later, Otsu has again employed systems employing reduced nickel and an alkyl halide for polymerizing methyl methacrylate or styrene or to obtain block copolymers of the above two monomers (see: T. Otsu, Chem. Express 1990, 5, 801 or T. Otsu, Mem. Fac. Eng., Osaka City Univ. 1989, 30, 103). He notes that this type of system is living, but no polydispersity value is given. In addition, in the case of styrene polymerization bimodal distributions are obtained. This bimodality is also observed in the case of the styrene—methyl methacrylate copolymers (see: T. Otsu, Mem. Fac. Eng., Osaka City Univ. 1989, 30, 103).

Other complexes of nickel in the (0) state, like $Ni[P(OR)_3]_4$ (K. Hargreaves, J. Polym. Sci. Polym. Chem. 26, 465 (1988)) or $Ni(CO)_4$ (C. H. Bamford, Trans. Farad. Soc. 66, 2598 (1970)), have been tested in the presence of alkyl halides as initiators for vinyl monomers, but no mention is made of living character.

Furthermore, in the case of emulsion or suspension polymerization it is known that most of the processes are used in aqueous medium and, therefore, it is necessary to work at temperatures which are lower than 100° C. to ensure the stability of these emulsions or suspensions.

The temperature can undoubtedly be lowered, but the presence of Lewis acids is then necessary, and this involves working in an anhydrous medium.

It is also necessary that the catalyst should not be degraded by water in the standard conditions of polymerization.

SUMMARY OF THE INVENTION

The aim of the present invention consists, consequently, in overcoming the abovementioned disadvantages and in carrying out radical polymerizations which permit a control that is identical with the ionic and coordinative polymerizations in industrially acceptable conditions of synthesis and which, consequently, make it possible to synthesize homopolymers and random or pure block copolymers, perfectly defined, whose length is predetermined and which it has not been possible to synthesize so far.

In general, the aim of the invention is to introduce a process for radical polymerization or copolymerization of (meth)acrylic and/or vinyl monomers making it possible to control the growth of the polymer chains, the polymerization process being performed in bulk, solution, emulsion or suspension until all of the above monomer(s) is(are) consumed.

To do this, it is necessary to avoid, or at the very least to limit, the reactions of termination via recombination and disproportionation and to promote a rapid initiation of the polymerization or copolymerization.

Thus one of the essential aims of the invention is to propose catalysts and initiators which make it possible, without requiring an appreciable modification of the conventional technology, to obtain, in industrially and economically viable conditions, polymers and copolymers meeting the commercial requirements of structure selectivity, stereoselectivity and of control of the molecular masses and of their distributions.

To this end, according to the present invention a process for controlled radical polymerization or copolymerization of (meth)acrylic and/or vinyl monomers is provided, characterized in that at least one of the said monomers is polymerized or copolymerized in bulk, solution, emulsion or suspension, at a temperature which can be as low as 0° C., in the presence of an initiating system including:

at least one compound generating radicals, other than bromofluorene; and at least one catalyst consisting of a complex of palladium in the 0 oxidation state, denoted by the following formula (I):

Pd(0)L$^1$L$^2$L$^3$L$^4$        (I)

in which each of L$^1$, L$^2$, L$^3$ and L$^4$, which are identical or different, denotes a ligand which may be a chiral ligand, which is chosen from PRR'R", P(OR)(OR')(OR"), NRR'R", ORR', SRR', SeRR', AsRR'R" and SbRR'R", where each R, R', R" independently denotes an optionally substituted C$_1$–C$_{14}$ alkyl group or an optionally substituted aromatic group, it being possible for at least two of these ligands to be joined to each other by one or more divalent radicals. These divalent radicals may be, for example, an alkylene radical such as the methylene (—CH$_2$—), ethylene (—CH$_2$CH$_2$—) and trimethylene (—CH$_2$CH$_2$CH$_2$—) radicals which may themselves be substituted, for example by a C$_1$–C$_{14}$ alkyl or aryl group.

A ligand could present a chirality in its structure in order to obtain a stereoregular polymer.

In particular, each of L$^1$, L$^2$, L$^3$ and L$^4$ denotes a phosphine PRR'R", each of R, R' and R" independently denoting a C$_1$–C$_{14}$ alkyl group which may be substituted by SO$_3^-$, COOH, alkoxy or alkyl-S— or an aromatic group which may be substituted by at least one substituent chosen especially from halogen such as Cl, Br or F, alkyl, CF$_3$, alkoxy, NO$_2$ or SO$_3^-$, it being possible for at least two of these ligands to be connected to form a polyphosphine which may contain at least one heteroatom such as N, P, S and O.

Examples of optionally substituted alkyl groups forming part of the definition of R, R' and R" which may be mentioned are methyl, ethyl, n-propyl, n-butyl and NCCH$_2$CH$_2$—, and examples of optionally substituted aromatic groups which may be mentioned are phenyl, 1-naphthyl, p-FC$_6$H$_4$, m-ClC$_6$H$_4$, o-CH$_3$OC$_6$H$_4$, p-CH$_3$OC$_6$H$_4$, p-CF$_3$C$_6$H$_4$, 2,4,6-trimethoxyphenyl, C$_6$F$_5$, o-CH$_3$C$_6$H$_4$, p-CH$_3$C$_6$H$_4$ and m-CH$_3$C$_6$H$_4$. Corresponding ligands which may be mentioned are in particular triphenylphosphine and tris(4-methoxyphenyl)phosphine.

There may also be mentioned the monophosphines carrying groups intended to make them soluble, such as sodium triphenylphosphinemonosulphonate (TPPMS) or sodium triphenylphosphinetrisulphonate (TPPTS):

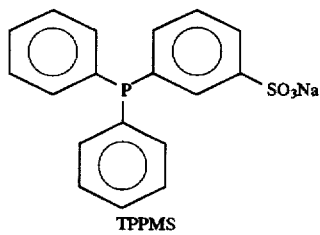

TPPMS

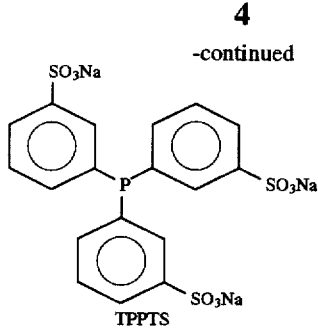

TPPTS and the chiral monophosphines such as (S)-(+)-neomenthyldiphenylphosphine ((S)-NMDPP) (CAS Number=43077-29-8).

O-SMe-C$_6$H$_4$-P-Ph$_2$ and O-SMe-C$_6$H$_4$-PPh-C$_6$H$_4$-O-SMe may also be mentioned.

As polyphospines there may be mentioned the compounds of the following general formula:

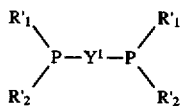

in which:

each of R$_1$ and R$_2$ independently denotes alkyl, substituted alkyl, alkyl carrying a —COOH or —NH$_2$ functional group, aryl or substituted aryl such as C$_6$H$_5$;

Y$^1$ denotes:
alkylene, substituted alkylene,
arylene, substituted arylene,
binaphthyl,
1,2-cyclopentyl,
—(CR'$_3$R'$_4$)$_n$—Z—(CR'$_5$R'$_6$)$_m$—, with each of R'$_3$ to R'$_6$ independently denoting H or alkyl, each of n and m denoting an integer from 0 to 3, and

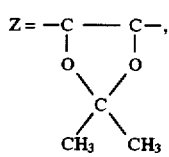

pyridyl or phenylene,
—[(CR'$_7$R'$_8$)$_p$—T]$_q$—(CR'$_9$R'$_{10}$)$_r$— with each of R'$_7$ to R'$_{10}$ independently denoting H or alkyl, p, q and r denoting an integer from 1 to 5, and T=—O—, —S—, —NR'$_{11}$—, —PR'$_{12}$ (R'$_{11}$, R'$_{12}$=C$_1$–C$_{14}$ alkyl or aryl).

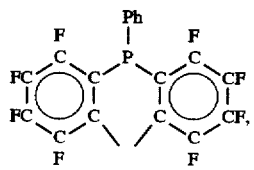

and
—C$_6$H$_5$—CH=CH—C$_6$H$_5$—.
In particular, there may be mentioned:
diphosphines, such as, for example,
Me$_2$PCH$_2$CH$_2$PMe$_2$
Ph$_2$PCH$_2$PPh$_2$
Ph$_2$PCH$_2$CH$_2$PPh$_2$

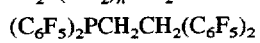

chiral diphosphines capable of contributing a stereospecificity to the polymerization, like:

- (4R,5R)-(−)-O-isopropylidene-2,3-dihydroxy-1,4-bis(diphenylphosphino)butane ((R,R)-DIOP) (CAS Number=37002-48-5),
- (4S,5S)-(+)-O-isopropylidene-2,3-dihydroxy-1,4-bis(diphenylphosphino)butane ((S,S)-DIOP),
- (R)-(+)-2,2'-bis(diphenylphosphino)-1,1'-binaphthyl ((R)-BINAP) (CAS Number=76189-55-4),
- (S)-(−)-2,2'-bis(diphenylphosphino)-1,1'-binaphthyl ((S)-BINAP) (CAS Number 76189-56-5),
- (2S,3S)-(−)-bis(diphenylphosphino)butane ((S,S)-CHIRAPHOS) (CAS Number=648976-28-2),
- (2S,4S)-(−)-2,4-bis(diphenylphosphino)pentane ((S,S)-BDPP) (CAS Number=77876-39-2),
- R-(+)-1,2-bis(diphenylphosphino)propane ((R)-PROPHOS) (CAS Number=67884-32-6), the diphosphines denoted by the formulae:

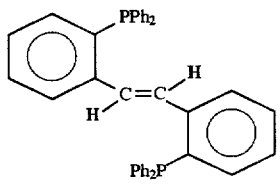

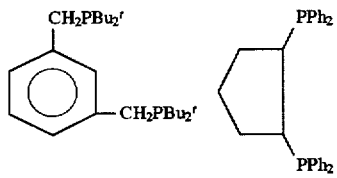

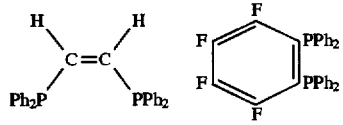

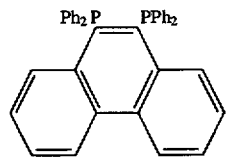

diphosphines containing heteroatoms, like, for example:

Ph$_2$PCH$_2$CH$_2$OCH$_2$CH$_2$PPh$_2$,
Ph$_2$PCH$_2$CH$_2$OCH$_2$CH$_2$OCH$_2$CH$_2$PPh$_2$,
Ph(CH$_2$COOH)PCH$_2$CH$_2$P(CH$_2$COOH)Ph,
Ph$_2$P (CH$_2$)$_n$S(CH$_2$ )$_m$S(CH$_2$)$_p$PPh$_2$, (each of n, m and p independently denoting 2 or 3), the diphosphines of formula:

Ph$_2$P(CH$_2$)$_n$PPh$_2$, n=3 to 14
(C$_6$F$_5$)$_2$PCH$_2$CH$_2$(C$_6$F$_5$)$_2$

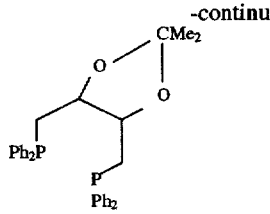

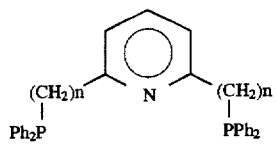

triphosphines like those of formulae:

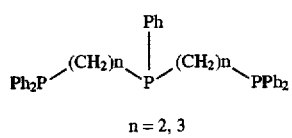

n = 2, 3

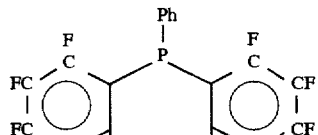

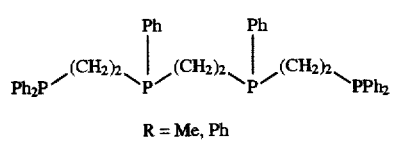

R = Me, Ph
n = 0, 1, 2 with PPh$_2$ capable of being replaced with PPhMe or PMe$_2$.

The ligands may also be chosen from the class of the phosphites P(OR)(OR')(OR"), with, for example, R, R' and R" chosen independently from n-butyl, isopropyl, ethyl, methyl, (CH$_3$)$_3$CCH$_2$— and C$_6$H$_4$.

The complex of formula (I) may be introduced directly into the reaction mixture or else it may be formed in situ in this mixture from a palladium (II) salt and ligands L$^1$, L$^2$, L$^3$ and L$^4$, or from a palladium(II) complex formed with a fraction of the ligands L$^1$ L$^2$ L$^3$ L$^4$ and the other fraction of the said ligands.

The palladium(II) salt may be chosen from PdCl$_2$, PdBr$_2$, PdI$_2$ and the salts of palladium and of organic acids, such as Pd(OAc)$_2$, and the palladium(II) complex from those of formula:

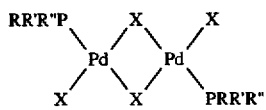

where:

R, R' and R" are as defined above, and
X denotes a halogen such as Cl or Br.

Since the catalyst does not act as a generator of radicals, it is then essential to use it in combination with such a compound. The reaction between the radical-generator and the palladium species described above gives rise to a controlled polymerization. It will thus be possible to continue a polymerization by adding a new quantity of a monomer, optionally different from the first one. If this monomer is different from the first one and if it is added after exhaustion of the first one, a block copolymer will be obtained. If it is added at the same time as the first one, the copolymerization will be random and a statistical copolymer will be obtained. For the preparation of block copolymers it is possible to envisage the use of a mixture of two or more catalysts, the second quantity of monomer being added in the presence of a different catalyst, but still of the type as defined within the scope of the present invention, this catalyst then needing to be more active than that already present. This operation can thus be repeated with each new block which it is intended to prepare.

In accordance with the invention, radical-generating compounds which are particularly suitable are halogen-containing compounds activated by nucleophilic and/or electrophilic effects on the carbon atom in an α position relative to the halogen(s) in the said compound, especially those indicated below:

When the radical-generator is monofunctional it may be chosen from the following classes of compounds:

(a) the derivatives of formula:

$$CYZ_3$$

where:

Y=Cl, Br, I, F or H, and

Z=Cl or Br, for example, carbon tetrachloride, chloroform, carbon tetrabromide and bromotrichloromethane.

(b) the derivatives of formula:

$$R^1CCl_3$$

where $R^1$ denotes a phenyl, benzyl, benzoyl, alkoxycarbonyl, 1-chloro-1-ethoxycarbonylethyl, $R^2CO$ with $R^2$ denoting $C_1$–$C_{14}$ alkyl or aryl, alkyl, mesityl, trifluoromethyl or nitro group, like, for example, α,α,α-trichlorotoluene, α,α,α-trichloroacetophenone, ethyl trichloroacetate, 1,1,1-trichloroethane, 1,1,1-trichloro-2-phenylethane, trichloromethylmesitylene, 1,1,1-trichloro-2,2,2-trifluoroethane, trichloronitromethane and methyl 2-chloro-2-trichloromethylpropionate.

(c) the derivatives of formula:

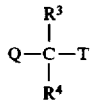

in which:

Q denotes a chlorine or bromine atom or an acetate

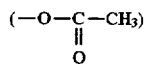

or trifluoroacetate

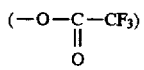

or triflate ($O_3SCF_3$) group.

$R^3$ denotes a hydrogen atom, a $C_1$–$C_{14}$ alkyl group or an aromatic group, for example of the benzene, anthracene or naphthalene type, or a —$CH_2OH$ group, T denotes a

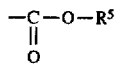

group with $R^5$ denoting each hydrogen or an alkyl or aromatic group, a CN group, a

group with $R^6$ denoting $C_1$–$C_{14}$ alkyl, phenyl or isocyanate, a hydroxyl group, a nitro group, a substituted or unsubstituted amino group, a $C_1$–$C_{14}$ alkoxy group, an $R^7CO$ group with $R^7$ denoting $C_1$–$C_{14}$ alkyl or aryl, $R^4$ denotes a group forming part of the definitions of $R^3$ or of Q or a functional group such as hydroxyl, nitro, substituted or unsubstituted amino, $C_1$–$C_{14}$ alkoxy, acyl, carboxylic acid or ester, like, for example, 2-bromopropionic acid, 2-bromobutanoic acid, 2-bromohexanoic acid, bromoacetonitrile, 2-bromopropionitrile, 2-bromoisobutyrophenone and chloroacetyl isocyanate, 2-bromo-2-nitro-1,3-propanediol and 2-bromo-2-nitropropane.

(d) α-halogenated lactone or lactam compounds like α-bromo-α-methyl-γ-butyrolactone or α-bromo-γ-valerolactone, halogenated lauryllactam or halogenated caprolactam.

(e) N-halosuccinimides, like N-bromosuccinimide and N-halophthalimides like N-bromophthalimide.

(f) alkylsulphonyl halides (chlorides and bromides), the alkyl residue being especially $C_1$–$C_{14}$, as well as arylenesulphonyl halides such as those of formula:

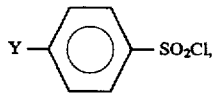

(g) the compounds of formula:

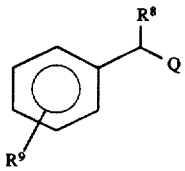

where:

$R^8$ denotes a hydrogen atom, a $C_1$–$C_{14}$ alkyl group or a carboxylic acid, ester, nitrile or ketone group.

$R^9$ denotes a hydrogen atom or a $C_1$–$C_{14}$ alkyl, hydroxyl, acyl, substituted or unsubstituted amine, nitro, $C_1$–$C_{14}$ alkoxy or sulphonate ($SO_3^-Na^+$ or $K^+$) group, and Q has the meaning given above.

(h) the compounds of formula:

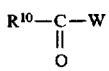

where:

$R^{10}$ denotes $C_1$–$C_{14}$ alkyl or aryl, and

W denotes a halogen, preferably Cl and Br, or a pseudohalide such as $N_3$ or SCN.

(i) the compounds of formula:

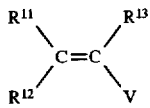

where:

each of $R^{11}$, $R^{12}$ and $R^{13}$ independently denotes $C_1$–$C_{14}$ alkyl or aryl, and V denotes a halide such as preferably Cl or Br or equally an acetate, trifluoroacetate or triflate group, and (j) the aromatic halides of formula:

where:

Ar denotes an aromatic group such as $C_6H_5$— which may be substituted in meta, ortho or para position by an electrophilic group such as $NO_2$, $NO_3$ or $SO_3$, or a nucleophilic such as an alkyl group or an —ONa group, and U denotes a halogen such as preferably Cl or Br.

It is also possible to envisage the use of generators of radicals which are difunctional and of higher functionality; the difunctional radical-generators may consist of two monofunctional radical-generators $A^1$ and $A^2$ of the abovementioned classes (c) to (j), connected by a chain of methylene units or by a benzene ring, as represented by the formulae:

$A^1$—$(CH_2)_p$—$A^2$ with p an integer from 1 to 14 and

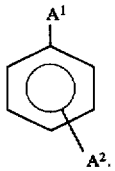

The difunctional initiator of formula:

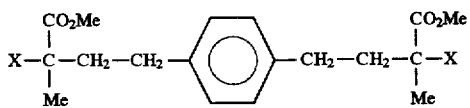

may, for example, be mentioned.

The compounds generating multifunctional radicals may consist of at least three monofunctional radical-generator groups $A^1$, $A^2$ and $A^3$ of the abovementioned classes (c) to (j) connected to each other by a benzene ring like, for example, those corresponding to the formula:

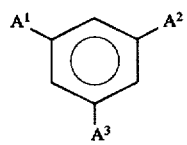

Other compounds generating difunctional radicals are tri- or tetrahalomethanes and the trichloromethyl derivatives of the abovementioned classes (a) and (b), it being possible for these same tri- and tetrahalomethanes also to be used as compounds generating multifunctional radicals.

It would also be possible to employ compounds generating difunctional radicals other than those represented above, especially those of the class of acetic anhydrides like the anhydride of chloroacetic acid and the anhydride of chlorodifluoroacetic acid, and radical-generators for conventional radical polymerization like peroxides and azo compounds, representative examples of the latter being especially dibenzoyl peroxide and 2,2'-azobisisobutyronitrile, respectively.

Particularly advantageous radical-generating compounds which will be mentioned are carbon tetrachloride, ethyl trichloroacetate, ethyl isobutyrate bromide and methyl 2-chloro-2-trichloromethylpropionate. In particular, sodium trichloroacetate, potassium trichloroacetate, sodium chlorodifluoroacetate, potassium chlorodifluoroacetate and sodium chloroacetate may be employed for emulsion polymerization.

The polymerization according to the invention may advantageously be conducted in the presence of an activator which may be either a Lewis base (OH, $Et_3N$, $CH_3CO_2^-$, $CF_3CO_2^-$) or acid, like, for example, aluminium alcoholates such as Me—Al—$(OAr)_2$ (cf. present Example 3) or $Al(OiPr)_3$. The function of the activator is to increase the rate of polymerization (for example in the case of Lewis acids after coordination of the Lewis acid onto the last C=O bond of the growing poly(methyl methacrylate) chain) or to improve the control of the polymerization (for example after addition of a base whose function is to maintain the palladium in the 0 oxidation state or to reduce the palladium to palladium in the 0 state).

Since the length of the polymer chains is predetermined by the molar ratio of the (meth)acrylic or vinyl monomer(s) to the radical-generating compounds, this ratio is 1–100 000, advantageously from 50 to 2000. As for the molar ratio of the palladium to the radical-generator(s), this is generally between 0.01 and 100, advantageously between 0.05 and 20. The molar ratio of the palladium(II) salt to the ligand, in the case of the formation of the compound (I) in situ, may vary between 0.05 and 20.

The polymerization or copolymerization temperature parameter is an extremely important point which distinguishes the process of the invention from the processes using catalyst systems known at present. With the known catalytic processes an inactivity of the catalyst is produced below a temperature which is around 100° C. in the absence of activator. Thus, at 50° C., no polymerization takes place with the CuCl/2,2-bipyridine catalyst and, in the absence of activator, with the $RuCl_2(PPh_3)_3$ catalyst, this being even after several days' reaction. Mild reaction conditions may be considered, in the context of the present invention, since it is very uncommon for catalysts in synthesis to remain active at temperatures that can be as low as 0° C. at atmospheric pressure. This advantage is extremely important, all the more so since the stereocontrol of the polymerization or copolymerization reaction is promoted by a lowering of the temperature. Otherwise, the reaction conditions in bulk (that is to say in the pure monomer(s)) and in solution, emulsion or suspension are generally identical. The temperature and all the molar ratios may be the same ones whatever the reaction process employed. The possibility of working, free of risks, in pure monomer constitutes, of course, an improvement with regard to the conventional radical polymerizations. Since the concentration of active centres is constant throughout the polymerization or copolymerization reaction because of the absence of termination reactions, the high and abrupt exotherm (or Trommsdorf effect) of the conventional radical polymerizations does not take place. In the case of the industrial process this, of course, constitutes a considerable step forward since the polymerizations or copolymerizations conducted in these conditions no longer run the risk of becoming completely uncontrolled. In general, the polymerization or copolymerization will be performed at a temperature of 0° C. to 130° C., advantageously between 40° and 90° C., without any loss of catalyst activity.

Since the initiating systems according to the invention are compatible with water, the polymerization or copolymerization reactions can then be performed in an aqueous medium, in the presence or absence of emulsifiers. Thus, the polymerizations in aqueous medium are performed either in suspension (radical-generating compound insoluble in water) or in emulsion (radical-generating compound soluble in water), in the presence of at least one emulsifier. The emulsifiers may be anionic surfactants such as sodium dodecylbenzenesulphonate, sodium dodecyl sulphate, sodium lauryl sulphate and mixtures thereof or of the neutral type like glycol esters, esters of sorbitan and polyethylene glycol such as sorbitan polyethylene glycol monolaurate, monopalmitate, monooleate and stearate, esters of fatty acids and polyethylene glycol such as polyethylene glycol stearate and ethers of fatty alcohols and of polyethylene glycol such as polyethylene glycol stearyl and cetyl ethers.

When conducted in solution, the polymerization or copolymerization reactions of the invention can, of course, also take place in the presence of an organic solvent or of a mixture of organic solvents belonging to the following classes of solvents:

aromatic (apolar aprotic) hydrocarbons: benzene, toluene, ethylbenzene, xylene, chlorinated (polar aprotic) hydrocarbons: methylene chloride, chlorobenzene, cyclic (polar aprotic) ethers: tetrahydrofuran, dioxane, esters (polar): ethyl acetate, cyclohexyl acetate, ketones (polar): methyl ethyl ketone, cyclohexanone.

A chlorinated solvent can be employed if it does not interact or interacts very little with the palladium salt or the compound (I), so as not to give interfering radicals.

The abovementioned organic solvents are particularly suitable when the monomers to be polymerized or copolymerized are acrylic monomers (methacrylates, acrylates, acrylonitrile) and vinylaromatic ones, such as styrene-based ones.

In some cases, especially in the polymerization of n-butyl methacrylate and styrene, hexane and cyclohexane can be employed and, in the polymerization of vinyl acetate and of acrylonitrile, dimethylformamide, dimethyl sulphoxide, acetonitrile or acetone may be employed.

In general, the polymerization and copolymerization process in accordance with the invention takes place in an identical manner in the case of homopolymerization and statistical copolymerization. For the preparation of block copolymers, including star-shaped block copolymers, the experimental conditions can change on the addition of a monomer differing from the first one after the polymerization of the first monomer. For example, the temperature may be varied in one direction or in the other, it being possible for the second quantity to be added with a solvent. For the preparation of macromonomers or of α,ω-functionalized (telechelic) polymers it would be possible to envisage the same type of change of experimental conditions.

As monomers which are polymerizable and copolymerizable in the presence of the proposed system for initiating polymerization or copolymerization there may be mentioned (meth)acrylic and vinyl monomers (vinylaromatics, vinyl esters like vinyl acetate, vinyl chloride).

The initiation system according to the invention is also suitable for the (co)polymerization of olefinic monomers, optionally fluorinated, like ethylene, butene, hexene and 1-octene. It is also suitable for the (co)polymerization of monomers containing conjugated double bonds, such as butadiene and isoprene.

An acrylic monomer within the meaning of the present invention is intended to mean a monomer chosen from primary, secondary or tertiary alkyl acrylates in which the alkyl group, if appropriate substituted, for example by at least one halogen atom such as fluorine and/or at least one hydroxyl group, contains 1 to 18 carbon atoms, with more particular mention of ethyl acrylate, propyl acrylate, isopropyl acrylate, butyl acrylate, isobutyl acrylate, hexyl acrylate, tert-butyl acrylate, 2-ethylhexyl acrylate, nonyl acrylate, lauryl acrylate, stearyl acrylate, cyclohexyl acrylate, isodecyl acrylate and phenyl acrylate, isobornyl acrylate, alkylthioalkyl or alkoxyalkyl acrylates, acrylonitrile and dialkylacrylamides.

A methacrylic monomer within the meaning of the present invention is intended to mean a monomer chosen from alkyl methacrylates in which the alkyl group, if appropriate substituted, for example by at least one halogen atom like fluorine and/or at least one hydroxyl group, contains 1 to 18 carbon atoms, like methyl, ethyl, 2,2,2-trifluoroethyl, n-propyl, isopropyl, n-butyl, sec-butyl, tert-butyl, n-amyl, i-amyl, hexyl, 2-ethylhexyl, cyclohexyl, octyl, i-octyl, decyl, β-hydroxyethyl, hydroxypropyl and hydroxybutyl methacrylates and glycidyl methacrylate, norbornyl methacrylate, methacrylonitrile and dialkylmethacrylamides.

A vinylaromatic monomer within the meaning of the present invention is intended to mean an aromatic monomer containing ethylenic unsaturation, such as styrene, vinyltoluene, alpha-methylstyrene, 4-methylstyrene, 3-methylstyrene, 4-methoxystyrene, 2-hydroxymethylstyrene, 4-ethylstyrene, 4-ethoxystyrene, 3,4-di-methylstyrene, 2-chlorostyrene, 3-chlorostyrene, 4-chloro-3-methylstyrene, 3-tert-butylstyrene, 2,4-dichlorostyrene, 2,6-dichlorostyrene and 1-vinylnaphthalene.

In accordance with the invention it has been found that, by a judicious combination of a metal complex as defined above and of a compound generating radicals for polymerization, it is possible successfully to obtain homopolymers and block and statistical copolymers which are perfectly defined and controlled, as well as star-shaped copolymers and macromonomers and α,ω-functionalized (telechelic) polymers which could not hitherto be synthesized with the conventional radical polymerization processes.

The invention therefore also relates to the polymers or copolymers as obtained by the abovementioned process, with controlled molecular masses and with narrow polydispersity.

The polymers and copolymers of (meth)acrylic and vinyl monomers, as obtained by the process of the invention exhibit molecular masses $\overline{Mn}$ which lie between 400 and 10 000 000 g/mol and a particularly narrow polydispersity $\overline{Mw/Mn}$, lower than 2, generally lower than 1.5 and particularly between 1.05 and 1.5. In the context of radical polymerization this constitutes a considerable step forward since not very long ago it was unthinkable to obtain molecular weight distributions or polydispersities $\overline{Mw/Mn}$ lower than 1.5. In addition, the process of the invention is extremely structure-selective, that is to say that it allows an excellent control over the orientation of the monomer units during the propagation. Furthermore, the chain sequences are oriented exclusively head-to-tail and no longer head-to-head as could be the case in conventional radical polymerization. This favours the thermal stability of the polymers and copolymers thus prepared. The absence of termination reactions eliminates any other possibility of head-to-head chain sequencing.

In comparison with the known radical and ionic processes for polymerization and copolymerization, the process of the present invention exhibits the following advantages:

- excellent molecular control: narrow $\overline{Mw/Mn}$ as far as approximately $\overline{Mw/Mn}=1.1$; good correlation between the theoretical $\overline{Mn}$ and the experimental $\overline{Mn}$ as a function of the radical generator; possibility of preparing block copolymers including those of star shape;
- mild temperature conditions ranging from 0° C. to 130° C. and ordinary pressure;
- the reaction time depends on the concentration of the reaction mixture. In fact, the lower the monomer concentration, the slower will be the polymerization kinetics. In a concentrated mixture ([monomer]>6 mol $l^{-1}$), the polymerization will be finished in less than two hours. In a more dilute mixture the polymerizations are generally stopped after 24 hours' reaction;
- compatibility in aqueous media because the catalysts employed do not decompose in the presence of water. Possibility of emulsion and suspension polymerization;
- possibility of stereocontrol, that is to say of the control of the hetero, syndio or isotactic tacticity, by employing chiral catalysts;
- excellent control of the synthesis of the polymers, or copolymers obtained whose molecular weights vary between 400 and 10 000 000 g/mol;
- the resistance of the polymers and copolymers to thermal degradation is improved because of the absence of termination reactions (combinations and disproportionations), which can be demonstrated especially by thermogravimetric analysis;
- preparation of new products to which access is difficult via usual polymerization techniques, such as pure block copolymers, specific statistical copolymers and hyperbranched polymers capable of being employed as controlled-formulation adhesives, impact-strength additives, emulsifying agents and interfacial agents.

Nonlimiting examples describing the preparation of polymers as obtained in accordance with the process of the present invention are given below.

EXAMPLE 1

Polymerization of Methyl Methacrylate (MMA)

Into a round bottom flask are weighed 224 mg ($1.0 \times 10^{-3}$ mol) of palladium acetate [Pd(OAc)$_2$] and 1.048 g ($4.0 \times 10^{-3}$ mol) of triphenylphosphine (PPh$_3$) previously recrystallized from absolute ethanol. The flask is blanketed with nitrogen (vacuum-nitrogen purge). 3.4 ml of toluene are added with the aid of a nitrogen-purged syringe. The toluene is degassed and distilled over calcium hydride before use. 1.87 g of methyl methacrylate (MMA) are added with the aid of a nitrogen-purged syringe. The MMA has been degassed and distilled over calcium hydride beforehand. It is stored at $-30°$ C. in the absence of light. 15.4 mg ($1.0 \times 10^{-4}$ mol) of carbon tetrachloride are added as solution in 1 ml of toluene with the aid of a nitrogen-purged syringe. The flask is placed in an oil bath at a temperature of 70° C. for 24 hours, with magnetic stirring. The flask is then opened and toluene is added in order to dilute the reaction mixture, which is filtered and then reconcentrated under vacuum. The polymer solution thus obtained is precipitated into a nonsolvent such as methanol or heptane. After filtering and washing, the polymer is dried to constant weight under vacuum at 60° C.

Poly(methyl methacrylate) (PMMA) is obtained in a 76% yield.

$\overline{Mn}_{exp}=16\ 000$ g/mol (PMMA standards)

$\overline{Mn}_{theo}=11\ 900$ g/mol $\overline{Mw/Mn}=1.8$.

The latter values are obtained in the following manner. A steric exclusion chromatography (SEC) is performed, which makes it possible to separate the PMMA macromolecules according to their size in solution (hydrodynamic volume). They are then eluted with a solvent for PMMA (THF mobile phase). The largest molecules come out first and the smallest ones last because of the longer path in the pores of the column (stationary phase). PMMAs or polystyrene of known absolute masses (determined by another method) are also injected (standards) and make it possible to obtain a calibration curve from which are determined the relative molecular masses ($\overline{Mn}_{exp}$) of the polymer whose size and mass distribution or polydispersity ($\overline{Mw/Mn}$) it is intended to determine.

EXAMPLE 2

MMA Polymerization

The procedure is as in Example 1, except that the toluene is replaced with water.

| | |
|---|---|
| Pd(OAc)$_2$ | 224 mg ($1.0 \times 10^{-3}$ mol) |
| PPh$_3$ | 1.048 g ($4.0 \times 10^{-3}$ mol) |
| H$_2$O | 3.4 ml |
| MMA | 1.87 g |
| CCl$_4$ | 15.4 mg ($1.0 \times 10^{-4}$ mol) |
| Polymerization period | 24 hours |
| Oil bath temperature | 70° C. |
| Yield | 84% |
| $\overline{Mn}_{exp}$ | 23 000 moles (PMMA standard) |
| $\overline{Mn}_{theo}$ | 15 700 g/mol |
| $\overline{Mw/Mn}$ | 1.4 |

EXAMPLE 3

MMA Polymerization

The procedure is as in Example 1 except that the Lewis acid of formula:

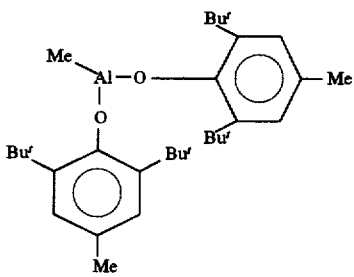

is added with the aid of a nitrogen-purged syringe after the MMA has been added to the reaction mixture.

| | |
|---|---|
| Pd(OAc)$_2$ | 11.22 mg (5.0 × 10$^{-5}$ mol) |
| PPh$_3$ | 52.4 mg (2.0 × 10$^{-4}$ mol) |
| Toluene | 15.2 ml |
| MMA | 1.87 g |
| Lewis acid | 96.0 mg (2.0 × 10$^{-4}$ mol) |
| CCl$_4$ | 15.4 mg (1.0 × 10$^{-4}$ mol) |
| Polymerization period | 24 hours |
| Oil bath temperature | 20° C. |
| Yield | 38% |
| $\overline{Mn}_{exp}$ | 23 700 g/mol (PMMA standard) |
| $\overline{Mn}_{theo}$ | 7100 g/mol |
| Mw/Mn | 1.35 |
| Syndiotactic PMMA content | 70% |

EXAMPLE 4

MMA Polymerization

The procedure is as in Example 1 except that the palladium acetate and the triphenylphosphine are replaced with the complex Pd(PPh$_3$)$_4$.

| | |
|---|---|
| Pd(PPh$_3$)$_4$ | 1.155 g (1.0 × 10$^{-3}$ mol) |
| Toluene | 3.4 ml |
| MMA | 1.87 g |
| CCl$_4$ | 15.4 mg (1.0 × 10$^{-4}$ mol) |
| Polymerization period | 24 hours |
| Oil bath temperature | 70° C. |
| Yield | 60% |
| $\overline{Mn}_{exp}$ | 30 000 g/mol (PMMA standard) |
| $\overline{Mn}_{theo}$ | 11 200 g/mol |
| Mw/Mn | 1.45 |

EXAMPLES 5 TO 9

In the experimental conditions described in Example 1 the molar ratio of MMA to CCl$_4$ is varied. In Table 1 below are given the experimental values of $\overline{Mn}$ as a function of the theoretical values of $\overline{Mn}$ determined by the relationship:

[$\overline{Mn}_{theo}$=[MMA]/[CCl$_4$]×conversion×the molecular mass of the MMA.

TABLE 1

| Example | Molar ratio [MMA] / [CCl$_4$] | Yield (%) | $\overline{Mn}_{theo}$ (g/mol) | $\overline{Mn}_{exp}$ (g/mol) |
|---|---|---|---|---|
| 5 | 180 | 64 | 11 500 | 16 000 |
| 6 | 487 | 94 | 45 800 | 68 000 |
| 7 | 974 | 78 | 76 000 | 66 000 |
| 8 | 1398 | 70 | 98 000 | 109 000 |
| 9 | 1950 | 61 | 119 000 | 117 000 |

It is found that $\overline{Mn}_{exp}$ varies substantially linearly with $\overline{Mn}_{theo}$.

EXAMPLE 10

Variable polymerization periods were employed in the experimental conditions described in Example 1. The results are reported in Table 2.

TABLE 2

| Polymerization period (hours) | Conversion (%) | $\overline{Mn}_{exp}$ (g/mol) |
|---|---|---|
| 0.5 | 44 | 11 000 |
| 1 | 55 | 16 000 |
| 2 | 68 | 18 000 |
| 263 | 77 | 25 000 |

The mass $\overline{Mn}_{exp}$ varies substantially linearly with the conversion.

EXAMPLE 11

The procedure is as in Example 1, except that the operation is carried out at 50° C. and that after 24 hours' polymerization 1.87 g of MMA are again added to the reaction mixture. After 24 hours with magnetic stirring the polymer is precipitated in accordance with the procedure of Example 1.

| | | |
|---|---|---|
| Pd(OAc)$_2$ | | 224 mg (1.0 × 10$^{-3}$ mol) |
| PPh$_3$ | | 1.048 g (4.0 × 10$^{-3}$ mol) |
| Toluene | | 8.4 ml |
| MMA | | two additions of 1.87 g |
| CCl$_4$ | | 15.4 mg (1.0 × 10$^{-4}$ mol) |
| Polymerization period | | twice 24 hours |
| Oil bath temperature | | 50° C. |
| Before repeat | Yield | 75% |
| | $\overline{Mn}_{exp}$ | 34 500 g/mol (PMMA standard) |
| | Mw/Mn | 1.4 |
| After repeat | Yield | 60% |
| | $\overline{Mn}_{exp}$ | 48 600 g/mol (PMMA standard) |
| | Mw/Mn | 1.8 |

It is found that the molecular mass $\overline{Mn}_{exp}$ has increased after addition of fresh monomer.

Example 11 shows that the polymerization of MMA initiated using the system according to the invention is a living polymerization.

EXAMPLE 12

The procedure is as in Example 11 except that after 3 hours' polymerization a suspension of the mixture of palladium acetate and of triphenylphosphine in toluene containing n-butyl methacrylate (nBuMA) is added.

|  | First block: MMA polymerization | Second block: copolymerization of the preceding polymer with nBuMA |
| --- | --- | --- |
| Pd(OAc)$_2$ | 224 mg ($1.0 \times 10^{-3}$ mol) | 224 mg ($1.0 \times 10^{-3}$ mol) |
| PPh$_3$ | 1.048 g ($4.0 \times 10^{-3}$ mol) | 1.048 g ($4.0 \times 10^{-3}$ mol) |
| Toluene | 1.2 ml | 1.0 ml |
|  | 1 ml (0.936 g) |  |
| CCl$_4$ | 15.4 mg ($1.0 \times 10^{-4}$ mol) |  |
| nBuMA |  | 1 ml ($6.3 \times 10^{-3}$ mol) |
| Period | 3 h | 24 h |
| Oil bath temperature | 50° C. | 50° C. |
| Conversion | 69% | 73% |
| $\overline{Mn}_{exp}$ | 19 200 g/mol | 27 300 g/mol |
| Mw/Mn | 1.5 | 1.7 |

The ratio of the block sequences in the copolymer, determined by $^1$H NMR, is 65% of PMMA/35% of PnBuMA.

EXAMPLE 13

MMA Polymerization

The procedure is as in Example 1 except that PPh$_3$ is replaced with (4S,5S)-(+)-O-isopropylidene-2,3-dihydroxy-1,4-bis(diphenylphosphino)butane ((S,S)-DIOP).

| Pd(OAc)$_2$ | 22.4 mg ($1.0 \times 10^{-4}$ mol) |
| --- | --- |
| (S,S)-DIOP | 99.7 mg ($2.0 \times 10^{-4}$ mol) |
| Toluene | 1.7 ml |
| MMA | 0.749 g ($7.48 \times 10^{-3}$ mol) |
| CCl$_4$ | 1.54 mg ($1.0 \times 10^{-5}$ mol) |
| Polymerization period | 24 h |
| Oil bath temperature | 70° C. |
| Yield | 71% |
| $\overline{Mn}_{exp}$ | 47 000 g/mol (PMMA standards) |
| $\overline{Mn}_{theo}$ | 53 100 g/mol |
| Mw/Mn | 2.3 |

EXAMPLE 14

MMA Polymerization

The procedure is as in Example 1 except that PPh$_3$ is replaced with (R)-(+)-2,2'-bis(diphenylphosphino)-1,1'-binaphthyl ((R)-BINAP).

| Pd(OAc)$_2$ | 22.4 mg ($1.0 \times 10^{-4}$ mol) |
| --- | --- |
| (R)-BINAP | 124.5 mg ($2.0 \times 10^{-4}$ mol) |
| Toluene | 1.7 ml |
| MMA | 0.749 g ($7.48 \times 10^{-3}$ mol) |
| CCl$_4$ | 1.54 mg ($1.0 \times 10^{-5}$ mol) |
| Polymerization period | 24 h |
| Oil bath temperature | 70° C. |
| Yield | 42% |
| $\overline{Mn}_{exp}$ | 26 400 g/mol (PMMA standards) |
| $\overline{Mn}_{theo}$ | 31 400 g/mol |
| Mw/Mn | 2.2 |

EXAMPLE 15

The procedure is as in Example 1 except that PPh$_3$ is replaced with tris(4-methoxyphenyl)phosphine.

| Pd(OAc)$_2$ | 56 mg ($2.5 \times 10^{-4}$ mol) |
| --- | --- |
| P(pMeOC$_6$H$_4$)$_3$ | 352 mg ($1.0 \times 10^{-3}$ mol) |
| Toluene | 1.95 ml |
| MMA | 0.936 g ($9.36 \times 10^{-3}$ mol) |
| CCl$_4$ | 3.85 mg ($2.5 \times 10^{-5}$ mol) |
| Polymerization period | 24 h |
| Oil bath temperature | 70° C. |
| Yield | 100% |
| $\overline{Mn}_{exp}$ | 36 700 g/mol (PMMA standards) |
| $\overline{Mn}_{theo}$ | 37 400 g/mol |
| Mw/Mn | 1.8 |

EXAMPLE 16

MMA Polymerization

The procedure is as in Example 1, except that CCl$_4$ is replaced with CCl$_3$—CCl(Me)CO$_2$Me.

| Pd(OAc)$_2$ | 224 mg ($1.0 \times 10^{-3}$ mol) |
| --- | --- |
| PPh$_3$ | 1.048 g ($4.0 \times 10^3$ mol) |
| Toluene | 3.4 ml |
|  | 1.872 g ($18.72 \times 10^{-3}$ mol) |
| CCl$_3$-CCl(Me)CO$_2$Me | 23.99 mg ($1.0 \times 10^{-4}$ mol) |
| Polymerization period | 24 h |
| Oil bath temperature | 70° C. |
| Yield | 100% |
| $\overline{Mn}_{exp}$ | 20 400 g/mol (PMMA standards) |
| $\overline{Mn}_{theo}$ | 18 500 g/mol |
| Mw/Mn | 1.77 |

EXAMPLE 17

The procedure is as in Example 2 (polymerization in aqueous medium), except that the polymerization is conducted in the presence of the sorbitan polyethylene glycol monooleate surface-active agent marketed by ICI under the name "Tween® 80".

| Pd(OAc)$_2$ | 224 mg ($1.0 \times 10^{-3}$ mol) |
| --- | --- |
| PPh$_3$ | 1.048 g ($4.0 \times 10^{-3}$ mol) |
| Water | 6.3 ml |
| Tween ® 80 | 189 mg |
| MMA | 1.872 g ($18.72 \times 10^{-4}$ mol) |
| CCl$_4$ | 15.4 mg ($1.0 \times 10^{-4}$ mol) |
| Polymerization period | 24 h |
| Oil bath temperature | 70° C. |
| Yield | 86% |
| $\overline{Mn}_{exp}$ | 33 500 g/mol (PMMA standards) |
| $\overline{Mn}_{theo}$ | 16 100 g/mol |
| Mw/Mn | 1.54 |

The preceding examples can be repeated with similar success by substituting the generically or specifically described reactants and/or operating conditions of this invention for those used in the preceding examples.

With respect to the nomenclature used in the description of the invention, the term "molecular mass" is synonymous to molecular weight. Likewise, the term "radical polymerization" is sometimes referred to as "free radical polymerization" by other authors. The abbreviation "CAS" stands for "Chemical Abstracts", and the term "bromofluorene" is intended to designate 9-bromofluorene as specified in J. K. Stille and K. S. Y. Lau, *J. Amer. Chem. Soc.*, 98, 5841 (1970), discussed above.

The entire disclosure of all applications, patents and publications, cited above, and of corresponding French application 96/10124, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

We claim:

1. A process for controlled radical polymerization or copolymerization of (meth)acrylic and/or vinyl monomers, characterized in that at least one of the said monomers is polymerized or copolymerized in bulk, solution, emulsion or suspension, at a temperature which can be as low as 0° C., in the presence of an initiating system including:
   at least one compound generating radicals, other than bromofluorene; and
   at least one catalyst consisting essentially of a complex of palladium in the 0 oxidation state, denoted by the following formula (I):

$$Pd(0)L^1L^2L^3L^4$$

in which each of $L^1$, $L^2$, $L^3$ and $L^4$, identical or different, denotes a ligand, optionally chiral ligand, which is chosen from PRR'R", P(OR)(OR')(OR"), NRR'R", ORR', SRR', SeRR', AsRR'R" and SbRR'R", where each R, R', R" independently denotes an optionally substituted $C_1$–$C_{14}$ alkyl group or an optionally substituted aromatic group, it being possible for at least two of these ligands to be joined to each other by one or more divalent radicals.

2. A process according to claim 1, wherein each of $L^1$, $L^2$, $L^3$ and $L^4$ denotes a phosphine PRR'R", each of R, R' and R" independently denoting a $C_1$–$C_{14}$ alkyl group optionally substituted by $SO_3^-$, COOH, alkoxy or alkyl-S— or an aromatic group which may be substituted by at least one group chosen from halogen, alkyl, $CF_3$, alkoxy, $NO_2$ or $SO_3^-$, it being possible for at least two of these ligands to be connected to form a polyphosphine which may contain at least one heteroatom such as N, P, S and O.

3. A process according to claim 1, wherein at least one ligand is triphenylphosphine, tris(4-methoxyphenyl) phosphine, (4S,5S)-(+)-O-isopropylidene-2,3-dihydroxy-1, 4-bis(diphenylphosphino)butane or (R)-(+)-2,2'-bis (diphenylphosphino)-1,1'-binaphthyl is used as 5 ligand.

4. A process according to claim 3, wherein the catalyst is Pd(0).

5. A process according to claim 1, wherein the complex of formula (I) is formed in situ in the reaction mixture from a palladium(II) salt and ligands $L^1$, $L^2$, $L^3$ and $L^4$, or from a palladium(II) complex having a fraction of the ligands $L^1 L^2 L^3 L^4$ and a complementary fraction of said ligands in an uncomplexed form.

6. A process according to claim 5, wherein the palladium (II) salt is $PdCl_2$, $PdBr_2$, $PdI_2$ or a salt of palladium and an organic acid, and the palladium(II) complex is of the formula:

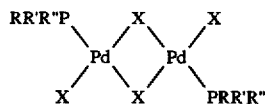

where:

X denotes a halogen.

7. A process according to claim 1, characterized in that the compound generating free radicals is monofunctional and is chosen from the following classes of compounds:

(a) derivatives of formula:

$$CYZ_3$$

where:
Y=Cl, Br, I, F or H, and
Z=Cl or Br.

(b) the derivatives of formula:

$$R^1CCl_3$$

where $R^1$ denotes phenyl, benzyl, benzoyl, alkoxycarbonyl, 1-chloro-1-ethoxycarbonylethyl, $R^2CO$ with $R^2$ denoting $C_1$–$C_{14}$ alkyl or aryl, alkyl, mesityl, trifluoromethyl or nitro.

(c) derivatives of formula:

in which:

Q denotes a chlorine or bromine atom or an acetate or trifluoroacetate or triflate group, $R^3$ denotes a hydrogen atom, a $C_1$–$C_{14}$ alkyl group or an aromatic group or a-$CH_2OH$ group, T denotes a

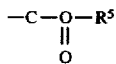

group, with $R^5$ denoting hydrogen or an alkyl or aromatic group, a CN group, a

group, with $R^6$ denoting $C_1$–$C_{14}$ alkyl, phenyl or isocyanate, a hydroxyl group, a nitro group, a substituted or unsubstituted amino group, a $C_1$–$C_{14}$ alkoxy group, an $R^7CO$ group with $R^7$ denoting $C_1$–$C_{14}$ alkyl or aryl, $R^4$ denotes a group forming part of the definitions of $R^3$ or of Q or a functional group such as hydroxyl, nitro, substituted or unsubstituted amino, $C_1$–$C_{14}$ alkoxy, acyl, carboxylic acid or ester, (d) α-halogenated lactone or lactam compounds, (e) N-halosuccinimides and N-halophthalimides, (f) alkylsulphonyl halides and arenesulphonyl halides, (g) compounds of formula:

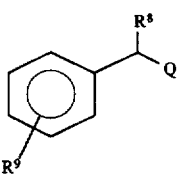

where:

$R^8$ denotes a hydrogen atom, a $C_1$–$C_{14}$ alkyl group or a carboxylic acid, ester, nitrile or ketone group, $R^9$ denotes a hydrogen atom or a $C_1$–$C_{14}$ alkyl, hydroxyl, acyl, substituted or unsubstituted amine, nitro, $C_1$–$C_{14}$ alkoxy or sulphonate group, and Q has the meaning given above.

(h) compounds of formula:

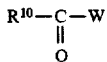

where:
$R^{10}$ denotes $C_1$–$C_{14}$ alkyl or aryl,
W denotes halogen or pseudohalide.

(i) compounds of formula:

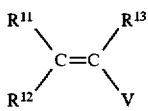

where:
each of $R^{11}$, $R^{12}$ and $R^{13}$ independently denotes $C_1$–$C_{14}$ alkyl or aryl, and
V denotes halogen, acetate, trifluoroacetate or triflate.

(j) aromatic halides of formula:

where:
Ar denotes an aromatic group such as $C_6H_5$— which may be substituted in ortho, meta or para position by an electrophilic or nucleophilic group, and
U denotes a halogen.

8. A Process for controlled radical polymerization or copolymerization of (meth)acrylic and/or vinyl monomers, characterized in that at least one of the said monomers is polymerized or copolymerized in bulk, solution, emulsion or suspension, at a temperature which can be as low as 0° C., in the presence of an initiating system including:

at least one compound generating radicals, other than bromofluorene; and at least one catalyst consisting of a complex of palladium in the 0 oxidation state, denoted by the following formula (I):

in which each of $L^1$, $L^2$, $L^3$ and $L^4$, which are identical or different, denotes a ligand which may be a chiral ligand, which is chosen from PRR'R", P(OR)(OR')(OR"), NRR'R", ORR', SRR', SeRR', AsRR'R" and SbRR'R", where each R, R', R" independently denotes an optionally substituted $C_1$–$C_{14}$ alkyl group or an optionally substituted aromatic group, it being possible for at least two of these ligands to be joined to each other by one or more divalent radicals, wherein the radical-generating compound is multifunctional and consists essentially of at least two groups of monofunctional radical-generating of classes (c) to (j) defined in claim 7, connected by a chain of methylene units or by a benzene ring; or is chosen from acetic anhydrides, and tri- or tetrahalomethanes and trichloromethylated derivatives of classes (a) and (b) defined in claim 7.

9. A process according to claim 7, wherein the radical-generating compound is carbon tetrachloride, ethyl trichloroacetate, ethyl isobutyrate bromide or methyl 2-chloro-2-trichloromethylpropionate.

10. A process according to claim 1, wherein the polymerization is conducted in the presence of at least one activator chosen from Lewis bases and acids.

11. A process according to claim 1 wherein the molar ratio of the monomer(s) to the radical-generating compound(s) is 1–100 000.

12. A process according to claim 1, wherein the molar ratio of palladium to the radical-generator(s) is 0.01 to 100.

13. A process according to claim 5, wherein the complex of formula I is formed from a palladium II salt and the molar ratio of the palladium (II) salt to the ligand is 0.05 to 20.

14. A process according to claim 1 wherein the polymerization or copolymerization is performed at a temperature of 0° C. to 130° C.

15. A process according to claim 1 wherein the polymerizable or copolymerizable monomers include at least one monomer chosen from methacrylates, acrylates, vinylaromatic derivatives, vinyl acetate and vinyl chloride.

16. A process according to claim 15, wherein the monomer is methyl methacrylate, ethyl methacrylate, n-butyl methacrylate, acrylonitrile or styrene.

17. A process according to claim 1 wherein a block copolymerization is conducted by introducing into the polymerization mixture in which the first monomer has been polymerized a second monomer, optionally with a new addition of initiation system.

18. A process according to claim 1, wherein the polymerization or copolymerization is conducted in aqueous medium, either in suspension or in emulsion in the presence of at least one emulsifier.

19. A process according to claim 18, wherein the at least one emulsifier is an anionic or non-ionic surfactant.

20. A process according to claim 1 wherein the polymerization or copolymerization is conducted in the presence of an organic solvent or of a mixture of organic solvents belonging to the following classes of solvents: aromatic hydrocarbons, chlorinated hydrocarbons, cyclic ethers, esters and ketones.

21. A polymers or copolymers obtained by a process as defined by claim 1, characterized in that they have a molecular weight $\overline{Mn}$ between 400 and 10 000 000 g/mol and a polydispersity $\overline{Mw}/\overline{Mn}$ lower than 2.

22. A process according to claim 3, wherein the radical-generating compound is carbon tetrachloride, ethyl trichloroacetate, ethyl isobutyrate bromide or methyl 2-chloro-2-trichloromethylpropionate.

* * * * *

UNITED STATES PATENT AND TRADEMARK OFFICE
CERTIFICATE OF CORRECTION

PATENT NO. : 5,767,210
DATED : June 16, 1998
INVENTOR(S) : Lecomte et al.

It is certified that error appears in the above-indentified patent and that said Letters Patent is hereby corrected as shown below:

Column 19, line 46: replace "Pd(O)" with --Pd(O)[PPh$_3$]$_4$--.

Signed and Sealed this

Seventeenth Day of November, 1998

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,767,210

DATED : June 16, 1998

INVENTOR(S) : Philippe Lecomte, et al

It is certified that error appears in the above-identified patent and that said Letters Patent is hereby corrected as shown below:

Column 19, line 44, delete "is used as 5 ligand".

Signed and Sealed this

Second Day of February, 1999

Attest:

Attesting Officer

*Acting Commissioner of Patents and Trademarks*